United States Patent
Lai et al.

(10) Patent No.: US 8,752,084 B1
(45) Date of Patent: *Jun. 10, 2014

(54) TELEVISION ADVERTISEMENT MONITORING SYSTEM

(75) Inventors: Timothy Lai, Fountain Valley, CA (US);
Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,656

(22) Filed: Jun. 8, 2012

Related U.S. Application Data

(63) Continuation of application No. 12/172,126, filed on Jul. 11, 2008, now Pat. No. 8,209,713.

(51) Int. Cl.
*H04N 7/10* (2006.01)
*H04N 7/173* (2011.01)

(52) U.S. Cl.
USPC .................... 725/32; 725/14; 725/42; 725/90

(58) Field of Classification Search
USPC .......................................... 725/14, 32, 42, 90
See application file for complete search history.

(56) References Cited

U.S. PATENT DOCUMENTS

| | | |
|---|---|---|
| 4,485,219 A | 11/1984 | Falk et al. |
| 4,760,526 A | 7/1988 | Takeda et al. |
| 5,333,091 A | 7/1994 | Iggulden et al. |
| 5,455,630 A | 10/1995 | McFarland et al. |
| 5,485,219 A | 1/1996 | Woo |
| 5,532,735 A | 7/1996 | Blahut et al. |
| 5,577,191 A | 11/1996 | Bonomi |
| 5,594,736 A | 1/1997 | Tatsumi et al. |
| 5,600,366 A | 2/1997 | Schulman |
| 5,652,615 A | 7/1997 | Bryant et al. |
| 5,661,516 A | 8/1997 | Carles |
| 5,664,948 A | 9/1997 | Dimitriadis et al. |
| 5,692,093 A | 11/1997 | Iggulden et al. |

(Continued)

FOREIGN PATENT DOCUMENTS

| | | |
|---|---|---|
| AU | 694568 | 3/1996 |
| DE | 19939410 A1 | 3/2001 |

(Continued)

OTHER PUBLICATIONS http://www.digitalnetworksna.com/support/replaytv/downloads/ReplayTV_5000_UG.pdf; ReplayTV 5000 manual; 2002; entire document.

(Continued)

*Primary Examiner* — Kieu Oanh T Bui

(57) ABSTRACT

The present invention discloses systems for monitoring advertisements. A system for monitoring advertisements in a broadcast television channel in accordance with the present invention comprises a sound level monitor for monitoring an audio level of a first broadcast television channel, a data tagger, coupled to the sound level monitor, for tagging a start and an end of an advertisement segment within the first broadcast television channel, and a receiver, wherein when the receiver is first tuned to the first broadcast channel and then tuned to a second broadcast channel, an on-screen display is displayed on a monitor displaying the second broadcast channel, the OSD being displayed when the end of the advertisement segment within the first broadcast channel occurs.

20 Claims, 4 Drawing Sheets

(56) References Cited

U.S. PATENT DOCUMENTS

| | | |
|---|---|---|
| 5,696,866 A | 12/1997 | Iggulden et al. |
| 5,724,472 A | 3/1998 | Abecassis |
| 5,790,174 A | 8/1998 | Richard et al. |
| 5,848,397 A | 12/1998 | Marsh et al. |
| 5,886,731 A | 3/1999 | Ebisawa |
| 5,892,536 A | 4/1999 | Logan et al. |
| 5,986,692 A | 11/1999 | Logan et al. |
| 5,987,210 A | 11/1999 | Iggulden et al. |
| 5,995,092 A | 11/1999 | Yuen et al. |
| 5,999,688 A | 12/1999 | Iggulden et al. |
| 6,100,941 A | 8/2000 | Dimitrova et al. |
| 6,177,931 B1 | 1/2001 | Alexander et al. |
| 6,215,526 B1 | 4/2001 | Barton et al. |
| 6,226,444 B1 | 5/2001 | Goldschmidt Iki et al. |
| 6,233,389 B1 | 5/2001 | Barton et al. |
| 6,258,818 B1 | 7/2001 | Lerner |
| 6,285,818 B1 | 9/2001 | Suito et al. |
| 6,310,886 B1 | 10/2001 | Barton |
| 6,324,338 B1 | 11/2001 | Wood et al. |
| 6,327,418 B1 | 12/2001 | Barton |
| 6,360,053 B1 | 3/2002 | Wood et al. |
| 6,404,977 B1 | 6/2002 | Iggulden |
| 6,937,658 B1 | 8/2005 | Suito et al. |
| 6,993,246 B1 | 1/2006 | Pan et al. |
| 7,143,353 B2 | 11/2006 | McGee et al. |
| 7,272,295 B1 | 9/2007 | Christopher |
| 7,302,490 B1 | 11/2007 | Gupta et al. |
| 8,209,713 B1 * | 6/2012 | Lai et al. .......................... 725/10 |
| 2001/0014891 A1 | 8/2001 | Hoffert et al. |
| 2001/0055463 A1 | 12/2001 | Armengaud |
| 2002/0065678 A1 | 5/2002 | Peliotis et al. |
| 2002/0126999 A1 | 9/2002 | Shimamoto et al. |
| 2003/0126598 A1 | 7/2003 | Agnihotri et al. |
| 2003/0167473 A1 | 9/2003 | Klosterman et al. |
| 2004/0045020 A1 | 3/2004 | Witt et al. |
| 2005/0223403 A1 | 10/2005 | Suito et al. |

FOREIGN PATENT DOCUMENTS

| | | |
|---|---|---|
| EP | 0693215 B1 | 11/1998 |
| EP | 0967611 A2 | 12/1999 |
| EP | 1071287 A2 | 1/2001 |
| EP | 1071287 A3 | 3/2001 |
| JP | 62209615 | 9/1987 |
| JP | 03-184484 | 8/1991 |
| JP | 10224724 A | 8/1998 |
| JP | 2000-115713 | 4/2000 |
| JP | 2000-165807 | 6/2000 |
| WO | 99/04561 A1 | 1/1999 |
| WO | 99/52279 A1 | 10/1999 |
| WO | 99/52285 A1 | 10/1999 |
| WO | 00/07368 A1 | 2/2000 |
| WO | 00/18108 A2 | 3/2000 |
| WO | 00/18108 A3 | 3/2000 |
| WO | 00/28736 A1 | 5/2000 |
| WO | 00/44171 A1 | 7/2000 |
| WO | 00/56072 A1 | 9/2000 |
| WO | 00/58833 A1 | 10/2000 |
| WO | 00/58834 A1 | 10/2000 |
| WO | 00/58967 A1 | 10/2000 |
| WO | 00/59214 A1 | 10/2000 |
| WO | 00/62298 A1 | 10/2000 |
| WO | 00/62299 A1 | 10/2000 |
| WO | 00/62533 A1 | 10/2000 |
| WO | 00/67475 A1 | 11/2000 |
| WO | 01/06370 A1 | 1/2001 |
| WO | 01/22729 A1 | 3/2001 |
| WO | 01/47238 A2 | 6/2001 |
| WO | 01/47249 A2 | 6/2001 |
| WO | 01/47279 A2 | 6/2001 |
| WO | 0146843 A2 | 6/2001 |
| WO | 01/65762 A2 | 9/2001 |
| WO | 01/65862 A2 | 9/2001 |
| WO | 01/76249 A1 | 10/2001 |
| WO | 01/89203 A2 | 11/2001 |

OTHER PUBLICATIONS

International Search Report dated May 15, 2007 in International Application No. PCT/US2004/08632.

Gotuit Video Slide Show; http://www.gotuit.com/slides/slide1.htm; printed Jun. 13, 2002.

International Search Report and Written Opinion dated Jul. 25, 2008 in International Application No. PCT/US2004/08891.

ReplayTV 4000 User Guide 12.1.7; downloaded from http://www.digitalnetworksna.com/support/replaytv/manuals_downloads.asp; copyright 2001.

ReplayTV 4500 User Guide; downloaded from http://www.digitalnetworksna.com/support/replaytv/manuals_downloads.asp; copyright 2002.

EPO communication intending grant dated May 24, 2011 in European Patent Application No. 03736500.4 filed Apr. 28, 2003 by Christopher Dow et al.

International Search Report dated Oct. 9, 2003 in International Application No. PCT/US2003/013334.

International Search Report dated Aug. 19, 2003 in International Application No. PCT/US2003/013093.

\* cited by examiner

TELEVISION ADVERTISEMENT MONITORING SYSTEM

BACKGROUND OF THE INVENTION

1. Field of the Invention

The present invention relates generally to satellite video systems, and in particular, to a method, apparatus, and article of manufacture for an advertisement monitoring system.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses systems and apparatuses for monitoring advertisements during television viewing.

A system for monitoring advertisements in a broadcast television channel in accordance with the present invention comprises a sound level monitor for monitoring an audio level of a first broadcast television channel, a data tagger, coupled to the sound level monitor, for tagging a start and an end of an advertisement segment within the first broadcast television channel, and a receiver, wherein when the receiver is first tuned to the first broadcast channel and then tuned to a second broadcast channel, an on-screen display is displayed on a monitor displaying the second broadcast channel, the OSD being displayed when the end of the advertisement segment within the first broadcast channel occurs.

Such a system further optionally comprises the start and end of the advertisement segment being determined by the sound level monitor detecting audio compression, the start and end of the advertisement segment being determined by the sound level monitor detecting a reshaped sound condition, the start and the end of the advertisement segment being marked using a Vertical Blanking Interval, an Entitlement Management Message, a Conditional Access Packet, or an internet connection, a video recorder, coupled to the receiver, wherein the recorder uses the tagged start and the tagged end of the advertisement segment during recording, and the video recorder skips the advertisement segment during recording.

Another system for monitoring portions of data provided in a broadcast television channel in accordance with the present invention comprises a sound level monitor for monitoring an audio condition of a first broadcast television channel, wherein a first mark is placed at a start of the audio condition and a second mark is placed at an end of the audio condition, and a receiver, wherein when the receiver is first tuned to the first broadcast channel and then tuned to a second broadcast channel, an on-screen display is displayed on a monitor when the second mark occurs within the first broadcast channel.

Such a system further optionally comprises the audio condition being audio compression, the audio condition being a reshaped sound condition, the start of the audio condition and the end of the audio condition being marked using a Vertical Blanking Interval, an Entitlement Management Message, a Conditional Access Packet, or an internet connection, a video recorder, coupled to the receiver, wherein the recorder uses the start and the end of the audio condition during recording, and the video recorder does not record the broadcast channel between the start and the end of the audio condition.

Other features and advantages are inherent in the systems and apparatuses disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
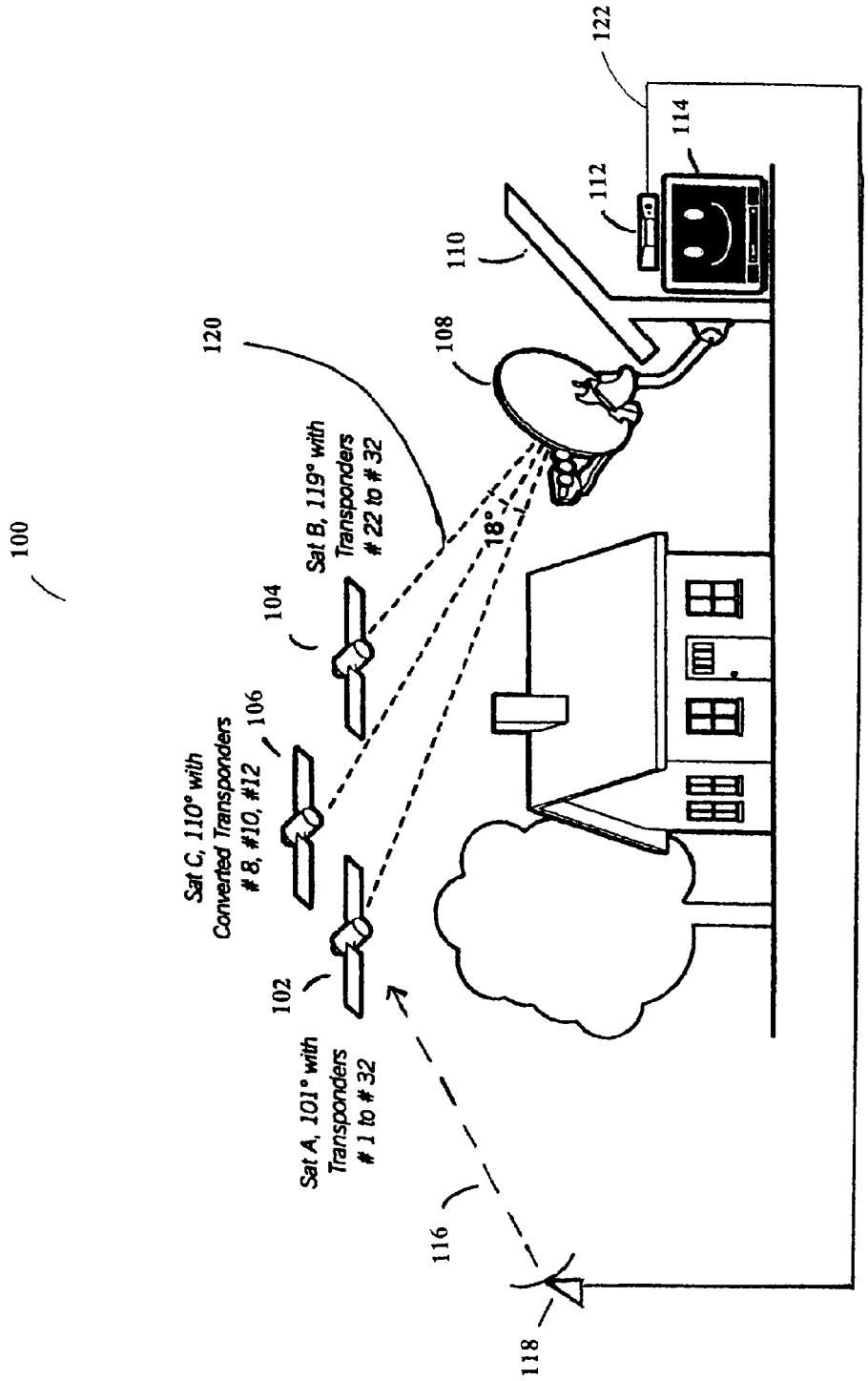
FIG. 1 illustrates a typical satellite television installation of the related art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention allows the viewer who is watching live television to temporarily change channels, e.g., "channel surf," when a commercial break starts and automatically alerts/reminds the viewer when the commercial or a pod of ads (a series of back-to-back commercials) is completed on the previously tuned channel. Once the present invention is activated, the viewer can channel surf or bring up other possible services on the television receiver, e.g., games, full screen channel guides, managing the PVR schedule, etc. When the end of a pod of commercials is detected, an On-Screen Display (OSD) is shown to the viewer, reminding the viewer that the regular programming has just resumed, and queries the viewer if they wish to go back to the previous channel. The viewer can then choose to either stay on the current channel or go back to the previous live program.

When live television enters a commercial break from the main programming, the viewer can activate the monitoring system of the present invention by pressing a predetermined button on the remote control, followed by a channel up/down selection or entering the digits for a new channel selection. Alternatively, activation of the system of the present invention can be done by directly entering the channel number and hitting a special key on the remote control, e.g., the "enter" or "channel change" keys. Another activation approach is to set the receiver to have the monitoring system as the default mode for a channel change. When the default is to have the monitoring system activated, the first channel change from normal viewing triggers the monitoring to begin and establishes monitoring for that channel, and any further channel changes, until the monitoring system detects the end of the advertisement pod. The receiver can detect the base channel to monitor by user control, e.g., selection of a button on the remote control, by a viewer remaining on a channel for a specific amount of time, e.g., five minutes on a single channel, or by other methods.

Once activated, the monitoring system of the present invention continuously monitors the live program on the "base" channel until the end of the commercial break is detected. There are several modes of monitoring the commercial break, e.g., a dedicated tuner remaining on the base channel and a second tuner used for channel surfing, using a broadband or dial-up phone connection to send a request to a server for the base channel, and a message being sent back to the receiver from the server when the commercial pod is finished, having the receiver join a multicast UDP stream sent over the satellite that provides an end-of-advertisement pod for all channels carried by the multi-channel broadcast operator, whether it is via satellite, cable, or broadband/dial-up. Further, a timer can be used to have a simplistic method, for commercials that are inserted at various known times in network broadcast shows.

The present invention can also monitor the commercial start and end points and mark the metadata start and end points into the PVR recording media file for advertisement-free playback, or, alternatively, automatically skip those sections during recording to save hard drive disk space.

With the monitoring system of the present invention, viewers are able to perform channel surfing or interaction with other user interface (UI) screens during live commercials and are notified in real time when the live programming resumes. Hence, the present invention enables viewers to attend to other things without missing any valuable minutes of an important live event.

Second, the present invention is capable of detecting start and end points of television commercial segments independent of their lengths. Viewers can thus choose to mark advertisements during recording for future use in various scenarios at a later time. The present invention can also insert start and end time tags into the recorded bitstream, which allows for an automated and more accurate skipping functionality during playback of recorded programming.

Remote Control

Figure 2:
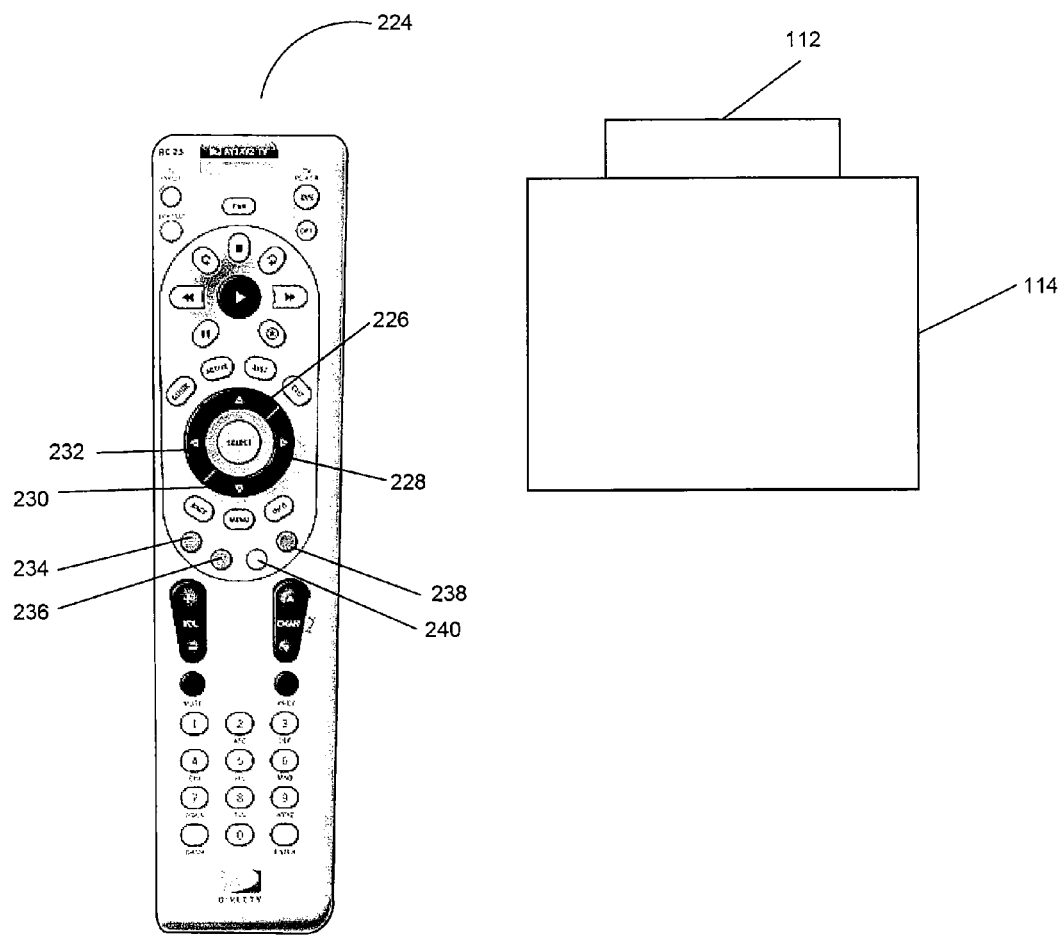
FIG. 2 illustrates a remote control used in the present invention.

FIG. 2 illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

The viewer has access to several commands through remote control 224, such as cursor controls which are typically controlled by buttons 226-240, but can be controlled by other buttons on the remote control 224 if desired.

System Diagram

Figure 3:
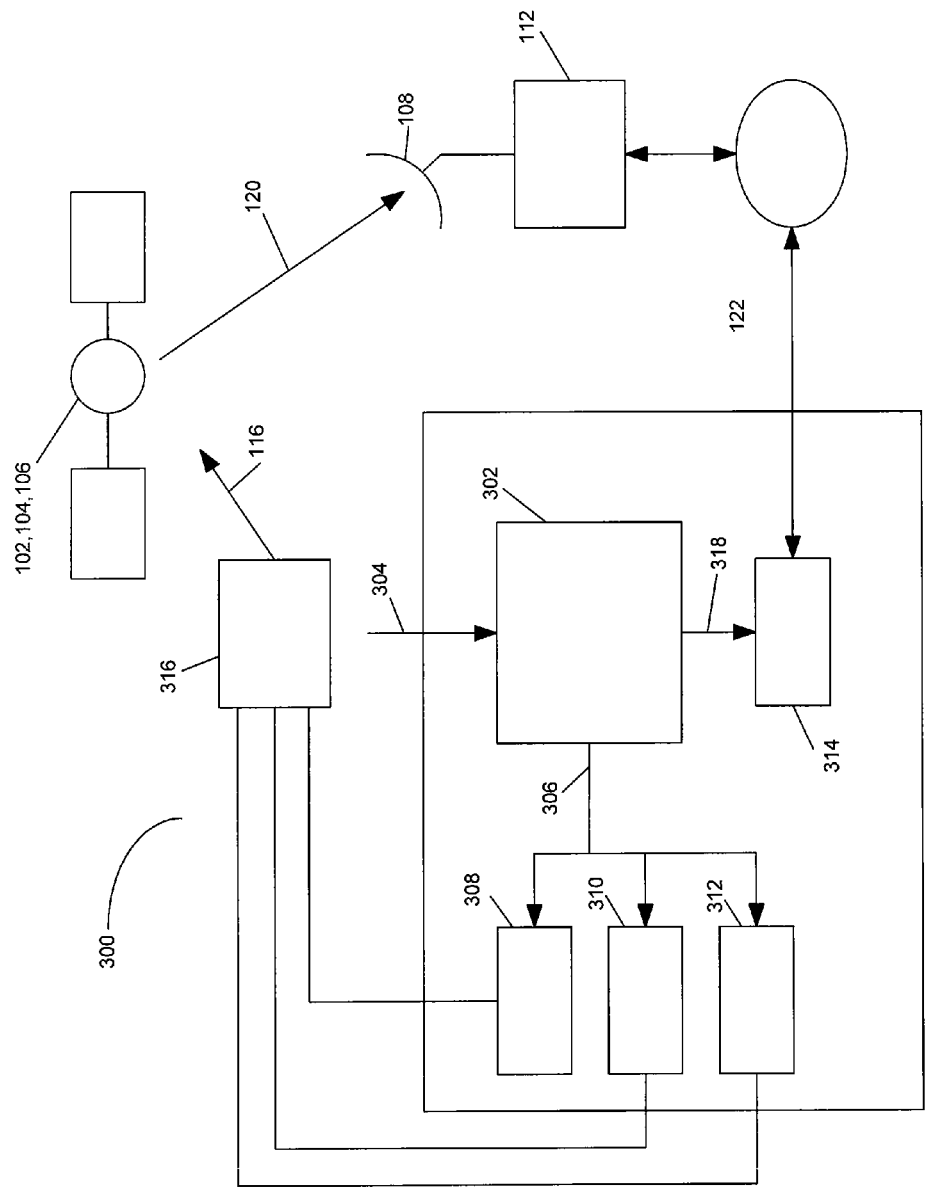
FIG. 3 illustrates a transmission portion of a system in accordance with the present invention.

FIG. 3 illustrates a transmission portion of a system in accordance with the present invention.

System 300 shows ad detection portion 302, which receives the audio, video, and text stream 304 and determines, through metadata, audio level monitoring, or other methods, the beginning (start) and end of a commercial advertisement or a pod of advertisements. As these points in the stream are determined, one or more methods are used to place marks or data points in the stream that can later be decoded by IRD 112.

The augmented video stream 306, i.e., the video stream with the start and end marks placed within, is passed to one or more of the Vertical Blanking Interface (VBI) encoder 308, Entitlement Management Message (EMM) generator 310. Conditional Access Packet (CAP) generator 312, and/or internet server 314. The outputs of the VBI encoder 308, EMM Generator 310, and CAP generator 312 are passed to the broadcast transmitter 316, and are then encoded and converted into uplink signals 116. Internet server 314 converts the start and end marks 318, which, if desired, can also contain the audio and video portion signals 304, for transmission on cable 122. Although the signals transmitted on cable 122 are typically internet protocol signals, they can use other protocols, e.g., cable television transmission protocols, without departing from the scope of the present invention.

As described with respect to FIG. 1, IRD 112 receives uplink signals 116 via downlink signals 120, and receives signals from cable 122, either via the internet on a broadband or dial-up connection, or via cable link to IRD 112.

Start and End of TV Commercial Detection

The system 300 of the present invention enables viewers to avoid TV ads during a live broadcast, omit ads during a recording, and/or skip over ads during a playback.

By monitoring the video and audio stream 304 with ad detection portion 304, the system 300 detects changes in the audio levels of the stream 304 to determine the start and end times of commercials. These start and end times are then transmitted along with the audio/video stream via satellite, or can also be sent via a secondary transmission link such as the interne, to IRD 112.

For example, and not by way of limitation, by using a broadband or dial-up connection via cable 122, the IRD 112 registers a monitoring request to server 314, which replies with a message to IRD 112 when the commercial pod is starting or ending.

In another example, again not by way of limitation, using the satellite downlink 120, or a broadband/dial-up connection, IRD 112 can join a multicast UDP broadcast that alerts when all channels for a given-multi-channel broadcast operator are entering or exiting an advertisement pod.

Audio Signature Analysis

Ad detection portion 304 typically detects one, two, or both of the often found audio signatures employed by commercial advertisements. The first is "audio compression" where a commercial's sound track is recorded at a constant and maximum loudness level. The second is "re-shaping the sound" where the frequencies that human hearing is most sensitive to are raised in level, while other frequencies are reduced in sound level. A reshaped sound condition or an audio compression condition is detected by ad detection portion 304, and start and end tags are applied to the signal at the points where the audio signatures meet the required conditions.

System 300 of the present invention allocates a tuner to the tuned channel and continuously monitors audio sound levels. Commercials are distinctive in the audio spectrum and/or volume. By continuously monitoring the channel, the present invention can sample the audio levels and compare that to the audio levels employed by commercials. Fuzzy logic can be applied to determine if the match is "close enough" to a commercial audio track to determine commercial or commercial pod location. In DVR systems, the recorded content is preferably indexed with a START marking such that a DVR that is attached to IRD 112 can mark the locations where the commercial segments are recorded, and can use the markings to best utilize the commercial segments.

When there is a run or pod of commercials, each separated by a possible split second fade to black or muted audio, the system 300 has a latency to look ahead to determine whether the next segment is normal programming or another commercial before alerting the viewer that the commercial pod is complete. When determination is made that the final end of commercials has occurred, and resumption of normal programming has started, an END mark can be placed in the VBI interval via VBI generator 308, and/or an EMM or CAP can be generated as part of the signal. The appropriate messages are then sent to IRD 112 via uplink 116 and/or cable 122. In DVR systems an END mark is preferably made in the record content, which is saved with the recorded media file. On playback from the DVR, these marks can be used to skip the sections between the START and END marks, or, optionally, real-time audio analysis can be done even during recording or time-shifted playback.

Per Channel CAP Announcement

Commercial end announcements can be sent to the IRD 112 over the satellites 102-106 in a Conditional Access Packet (CAP) via CAP generator 312 or Entitlement Management Message (EMM) via EMM generator 310 per viewer channel. CAPs could be sent on all of the transponders, so no second dedicated tuner would be needed in the IRD to continuously monitor these announcements for the channel of interest. In essence, IRD 112 would be tuned to a first channel, but the CAP/EMM messages of every channel would be part of the data stream for that channel, such that the tuner would be able to decode the start and end of commercials on every channel available to the IRD at a given time.

However, another approach is to use a dedicated single transponder or group of transponders for the CAPs or EMMs because of the system wide bandwidth savings. However, in such a system, the IRD 112 would need a dedicated tuner and transport filter to monitor the CAP/EMM messages while a second tuner tunes to the channel of interest.

The server 314 is equipped with monitoring equipment for each channel being broadcast in the multi-channel system. The server 314 tracks the start and end of each commercial pod per transmitted channel. The server 314 employs the audio monitoring technique and passes those messages as START and END marks, either via CAP, EMM, or other protocol, to IRD 112 via cable 122.

Real-time Status Over Broadband Connection

In this mode of operation, the IRD 112 can receive real-time status of the monitored channel from the internet server 314 via cable 122. For example, and not by way of limitation, the IRD 112 can use port forwarding and use UDP or TCP near-real-time advertisement start and end notification messages. The IRD 112 can request notifications for all channels in the network or for a requested subset of channels in the network. Alternatively, the IRD 112 can join a multicast UDP stream or use a global or channel specific RSS stream with the start and end notifications, again, with the ability to request notifications for all channels or some subset of the full complement of channels. Real-time status includes the start and end marks associated with advertisements, as well as the start and end marks of a pod or series of advertisements. The system 300 of the present invention is thus able to determine when a commercial is over and another commercial has started, or when a pod ends and the regular programming resumes, as in many IP-based television networks.

An alternative system 300 uses internet server 314 to provides this service only for IRDs 112 that are connected to and request notification of commercial start and end times from server 314. Notification can be sent by HTTP or XML, or any other internet protocol. Another method that can be used by system 300 is through User Datagram Protocol (UDP) where the IRD 112 connects to an associated IP port for a channel of interest in the broadcast stream.

Tags Embedded in the Vertical Blanking Interval (VBI)

Within the MPEG and DVBS standards, commercials and programming are identified in the VBI field of content that uniquely identifies the content material. If this is being provided, then the system can monitor this information and the tags within the VBI, and can thus be used to distinguish the start or end of a commercial.

The start and end of commercial tags can be embedded in the VBI, which is currently used to broadcast closed captioning and data. In digital networks, the VBI is represented as a field in the MPEG Group Of Pictures (GOP) header.

No second tuner is required to continuously monitor VBI on the channel of interest for embedded tags for the currently tuned channel. However, once the monitoring system of the present invention is activated and the viewer begins channel surfing, then a second tuner would be required to determine the Tags of the channel being monitored. Similarly, the tags can be embedded directly into the GOP header.

Setting Up the Monitoring System

Set Alert and Then Channel Surf

The system 300 of the present invention can be engaged during the viewing of any given channel. One approach is that once a commercial or pod of commercials starts, the viewer then changes channels to see what other programs are on, or attends to PVR scheduling issues, etc. When the advertisement or advertisement pod ends, an On-Screen Display (OSD) alert screen is displayed on the monitor 114 to inform the viewer that the advertisement ended and the program that the viewer was previously watching has resumed. The OSD gives the viewer a choice to return to the previous channel or to remain on the current channel via button choices on the remote control.

Figure 4:
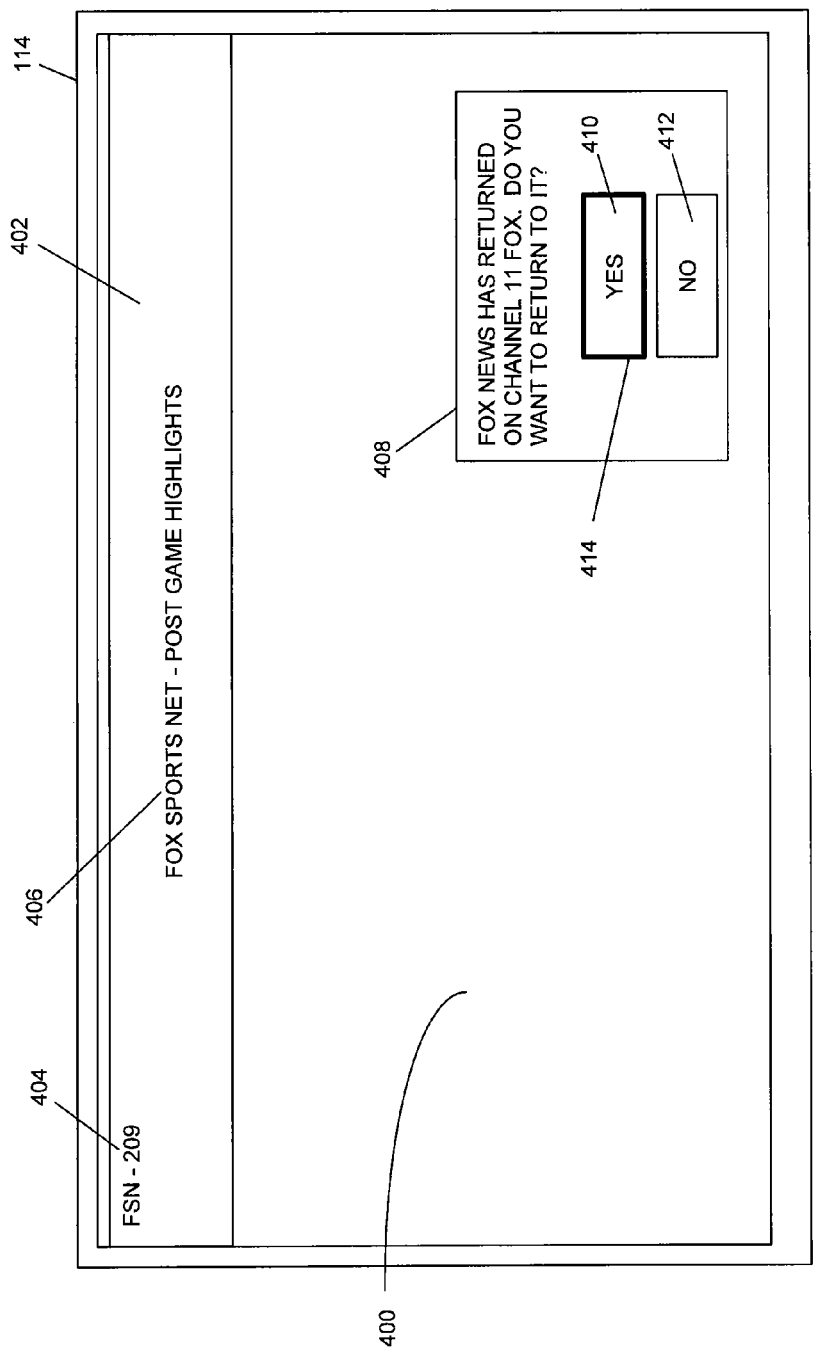
FIG. 4 illustrates an on-screen display in accordance with the present invention.

FIG. 4 illustrates an on-screen display in accordance with the present invention.

On monitor 114, video 400 is shown, which comprises header 402 that is typically shown for a periodic time during channel changes within system 100. Header 402 comprises a channel indicator 404 and a show identifier 406 that gives a channel and text description to inform the viewer of the general nature of the video being viewed on monitor 114.

Immediately prior to switching to video 400, the viewer was watching another viewer channel, e.g., channel 11. With the present invention engaged in system 300, either via VBI, EMM, CAP, or internet signaling to IRD 112, when commercials have ended on the previous channel, e.g., channel 11, OSD 408 is displayed on the current channel as an overlay to video 400. Within OSD 408, although the selection can be outside of OSD 408 if desired, selection graphics 410 and 412 can be provided. Using remote control 224 buttons 226-240, or other buttons on the remote control 224, to select graphic 410 or move the cursor 414 to graphic 412 and select graphic 412. Graphics 410 and 412 can also be ascribed or assigned to specific buttons, e.g., red button 234 for "no" and green button 236 for "yes" such that movement of cursor 414 is not needed; a single button press can be used to indicate the viewer's desire or lack of desire to return to the previously viewed channel.

Selection of the use of the present invention can be automatic, e.g., every time a user switches channels, the previous channel is monitored for commercial start and end tags. However, the system 300 can also place restrictions on the use of the monitoring resources, e.g., the user must activate the system through the remote control 224, the IRD 112 must remain on a specific channel for a predetermined or user-defined amount of time, or other automatic or user-defined parameters to limit the use of system 300 within system 100. For example, if a user is channel surfing, or does not remain on a channel for a specific amount of time, the system can ignore intermediate channel changes. If a base channel is not designated by the user, either via remote control 224 activation or via remaining on a specific channel for a given amount of time, the system 300 of the present invention can be programmed to not display the OSD 408.

For example, the "base" program can be specified by the viewer by pressing a special key on remote control 224 while tuned to that program. All channel changes from the base program automatically activate system 300 which then monitors that program. Once designated as a "base" program, the event is monitored until the program ends, the designation is canceled, or another event is selected to be the new "base" program.

Omit Commercials During Recording

With the system 300 of the present invention, viewers can choose not to record commercials by setting up a DVR attached to IRD 112 during a request to record the show. During DVR setup, an additional selection is given to the viewer to record the entire program or to record only the program without the commercials. If the latter is selected, the program is recorded without the commercials through the DVR/IRD 112 monitoring of the start and end tags in accordance with the present invention.

Skipping Commercials During Playback

When the user chooses to record a program in its entirety, the present invention still can insert start and end of commercial tags at the start and end of commercials in the recorded bitstream. The commercial demarcations make it possible for the DVR/IRD 112 to precisely skip commercials during a playback of the recorded program, even though the commercials were initially recorded.

Uses for the start and end marks of commercials and commercial pods other than skipping the commercials during recording and playback are possible within the scope of the present invention.

CONCLUSION

Although described with respect to advertisements, other portions of the broadcast channel can also be marked, either by the system 100 provider or by the user. Such marks can be used to skip forward during PVR playback, can be time-dependent (e.g., once a start tag or mark is placed, the end mark or tag automatically follows in two minutes, three minutes, etc.). Further, the IRD 112 can display the OSD 408 and automatically switch back to the first broadcast channel within a predetermined amount of time (e.g., 5 seconds) upon detection of the end mark rather than asking the viewer to make a choice.

A system for monitoring advertisements in a broadcast television channel in accordance with the present invention comprises a sound level monitor for monitoring an audio level of a first broadcast television channel, a data tagger, coupled to the sound level monitor, for tagging a start and an end of an advertisement segment within the first broadcast television channel, and a receiver, wherein when the receiver is first tuned to the first broadcast channel and then tuned to a second broadcast channel, an on-screen display is displayed on a monitor displaying the second broadcast channel, the OSD being displayed when the end of the advertisement segment within the first broadcast channel occurs.

Such a system further optionally comprises the start and end of the advertisement segment being determined by the sound level monitor detecting audio compression, the start and end of the advertisement segment being determined by the sound level monitor detecting a reshaped sound condition, the start and the end of the advertisement segment being marked using a Vertical Blanking Interval, an Entitlement Management Message, a Conditional Access Packet, or an internet connection, a video recorder, coupled to the receiver, wherein the recorder uses the tagged start and the tagged end of the advertisement segment during recording, and the video recorder skips the advertisement segment during recording.

Another system for monitoring portions of data provided in a broadcast television channel in accordance with the present invention comprises a sound level monitor for monitoring an audio condition of a first broadcast television channel, wherein a first mark is placed at a start of the audio condition and a second mark is placed at an end of the audio condition, and a receiver, wherein when the receiver is first tuned to the first broadcast channel and then tuned to a second broadcast channel, an on-screen display is displayed on a monitor when the second mark occurs within the first broadcast channel.

such a system further optionally comprises the audio condition being audio compression, the audio condition being a reshaped sound condition, the start of the audio condition and the end of the audio condition being marked using a Vertical Blanking Interval, an Entitlement Management Message, a Conditional Access Packet, or an internet connection, a video recorder, coupled to the receiver, wherein the recorder uses the start and the end of the audio condition during recording, and the video recorder does not record the broadcast channel between the start and the end of the audio condition.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents to the claims appended hereto.

What is claimed is:

1. An apparatus for omitting at least one segment of a video program that has been recorded, comprising:
   a sound level monitor that monitors an audio level of the video program;

a data tagger, coupled to the sound level monitor, that tags a start and an end of the at least one segment within the video program; and a video recorder, coupled to the data tagger, wherein the video recorder plays the video program while selectively omitting playing the at least one segment between the start of the at least one segment and the end of the at least one segment.

2. The apparatus of claim 1, wherein the at least one segment is at least one of a commercial, an advertisement, and a pod of commercials.

3. The apparatus of claim 1, wherein the start of the segment and the end of the segment are determined by the sound level monitor detecting a reshaped sound condition at the start of the segment and at the end of the segment.

4. The apparatus of claim 1, wherein the start of the segment and the end of the segment are marked using a Vertical Blanking Interval.

5. The apparatus of claim 1, wherein the start of the segment and the end of the segment are marked using an Entitlement Management Message.

6. The apparatus of claim 1, wherein the start of the segment and the end of the segment are marked using a Conditional Access Packet.

7. The apparatus of claim 1, wherein the start of the segment and the end of the segment are marked using an Internet connection.

8. The apparatus of claim 7, wherein the recording means records the at least one segment and the playback means selectively omits the at least one segment during playback of the video program.

9. The apparatus of claim 1, wherein the video recorder records the segment and selectively omits the segment during playback of the video program.

10. The apparatus of claim 9, wherein the segment is omitted based on a selection made when the recorded video signal is played back.

11. The apparatus of claim 1, wherein the video recorder omits recording the segment during recording of the video program.

12. A method for omitting a portion of data provided in a television channel signal to be recorded, comprising:

monitoring a condition of the television channel signal;

placing a first mark at a start of the condition and a second mark at an end of the condition of the television channel signal, the portion of data being between the first mark and the second mark;

recording the television signal that has the first mark and the second mark; and selectively omitting the portion of data during playback of the recorded television signal.

13. The method of claim 12, wherein the condition is at least one of audio compression and a reshaped sound condition.

14. The method of claim 12, wherein placement of the first mark and the second mark within the television channel signal is user-defined.

15. The method of claim 12, wherein the start of the audio condition and the end of the audio condition are marked using at least one of a Vertical Blanking Interval, an Entitlement Management Message, and a Conditional Access Packet.

16. The method of claim 12, wherein recording the television signal further comprises omitting recording the portion of data.

17. The method of claim 12, wherein the portion of data is selectively omitted based on a selection made when the recorded television signal is played back.

18. An apparatus for omitting at least one segment of a video program that has been recorded, comprising:

monitoring means for monitoring a characteristic of the video program;

tagging means, coupled to the monitoring means, for tagging a start and an end of the at least one segment within the video program having the characteristic; and recording means, coupled to the tagging means, for recording the video program having the characteristic with the tagged start and the tagged end of the at least one segment; and playback means, coupled to the recording means, for selectively omitting playing the at least one segment when the video program is played back.

19. The apparatus of claim 18, wherein the at least one segment is at least one of a commercial, an advertisement, and a pod of commercials.

20. The apparatus of claim 18, wherein the at least one segment is omitted based on a selection made when the recorded video signal is played back.

* * * * *